United States Patent
Beltran et al.

(10) Patent No.: US 9,982,737 B2
(45) Date of Patent: May 29, 2018

(54) DEVICE FOR ROTARY WING AIRCRAFT CAPABLE OF PROVIDING INFORMATION RELATIVE TO THE LEVEL OF FATIGUE-RELATED DAMAGE OF SAID DEVICE

(71) Applicant: Hutchinson, Paris (FR)

(72) Inventors: Eduardo Beltran, Villejuif (FR); Florian Briche, Levallois Perret (FR)

(73) Assignee: Hutchinson, Paris (FR)

( * ) Notice: Subject to any disclaimer, the term of this patent is extended or adjusted under 35 U.S.C. 154(b) by 62 days.

(21) Appl. No.: 15/085,030

(22) Filed: Mar. 30, 2016

(65) Prior Publication Data

US 2016/0290428 A1    Oct. 6, 2016

(30) Foreign Application Priority Data

Mar. 31, 2015   (FR) ...................................... 15 52721

(51) Int. Cl.
*F16D 55/08* (2006.01)
*F16F 7/08* (2006.01)
(Continued)

(52) U.S. Cl.
CPC .............. *F16F 7/087* (2013.01); *B64C 27/51* (2013.01); *B64F 5/60* (2017.01); *F16F 1/38* (2013.01);
(Continued)

(58) Field of Classification Search
CPC ...... B64C 27/51; B64F 5/60; F16F 2224/025; F16F 2230/0047
(Continued)

(56) References Cited

U.S. PATENT DOCUMENTS 3,317,189 A * 5/1967 Rubenstein ......... E01F 15/0453
                                                      256/13.1
2001/0010367 A1* 8/2001 Burnell-Jones ........ C09K 11/02
                                                      252/301.36
(Continued)

FOREIGN PATENT DOCUMENTS

EP    0 456 384 A1   11/1991
FR    2 860 582 A1    4/2005
(Continued)

OTHER PUBLICATIONS

Written Opinion on the Patentability of the Invention and Search Report from corresponding French Application No. 1552721 dated Jan. 26, 2016.

*Primary Examiner* — Anna M Momper
*Assistant Examiner* — Mahbubur Rashid
(74) *Attorney, Agent, or Firm* — Alston & Bird LLP (57) ABSTRACT

A device configured for insertion between two parts of a rotary wing aircraft that are likely to undergo a repeated relative movement. The device includes at least two frame elements intended to be mounted on at least one of the two parts of the aircraft, and at least one layer of elastomer positioned between the two frame elements, the at least one layer defined by a first surface belonging to the inner volume of the device, a second surface also belonging to the inner volume of the device, and an outer surface not belonging to the inner volume of the device. The inner volume of the device includes at least two independent pouches each positioned at a predetermined distance from the outer surface, each pouch being filled with a product capable of flowing outside its pouch when a crack has spread from said outer surface toward the pouch in question.

18 Claims, 10 Drawing Sheets

(51) Int. Cl.
 *B64C 27/51* (2006.01)
 *F16F 7/09* (2006.01)
 *B64F 5/60* (2017.01)
 *F16F 1/38* (2006.01)

(52) U.S. Cl.
 CPC ............ *F16F 7/09* (2013.01); *F16F 2222/04* (2013.01); *F16F 2224/025* (2013.01); *F16F 2230/0047* (2013.01); *F16F 2230/24* (2013.01); *F16F 2236/103* (2013.01)

(58) Field of Classification Search
 USPC ........................................................ 188/72.9
 See application file for complete search history.

(56) References Cited

U.S. PATENT DOCUMENTS

| | | | |
|---|---|---|---|
| 2003/0174504 A1* | 9/2003 | Tamaoki | ............... A01M 29/08 362/470 |
| 2005/0073111 A1* | 4/2005 | Herpin | ................... B64C 27/35 277/590 |
| 2011/0052395 A1 | 3/2011 | Louis et al. | |
| 2013/0164131 A1 | 6/2013 | Russell | |

FOREIGN PATENT DOCUMENTS

| | | |
|---|---|---|
| FR | 2 949 432 A1 | 3/2011 |
| JP | 2006-349068 A | 12/2006 |

\* cited by examiner

Fig. 6(c)
(Cross-section B-B)

DEVICE FOR ROTARY WING AIRCRAFT CAPABLE OF PROVIDING INFORMATION RELATIVE TO THE LEVEL OF FATIGUE-RELATED DAMAGE OF SAID DEVICE

FIELD

The present invention relates to a device, designed to be inserted between two parts of a rotary wing aircraft, that are likely to undergo a repeated relative movement with respect to one another and are able to provide information regarding the level of fatigue-related damage of the device.

BACKGROUND

One example of a rotary wing aircraft is a helicopter.

FR 2,949,432 (D1) proposes such a device, in the case at hand a damper designed to be installed on a rotary wing aircraft rotor.

The solution considered in this document consists of providing a single chamber within an elastomer layer.

Figure 1:
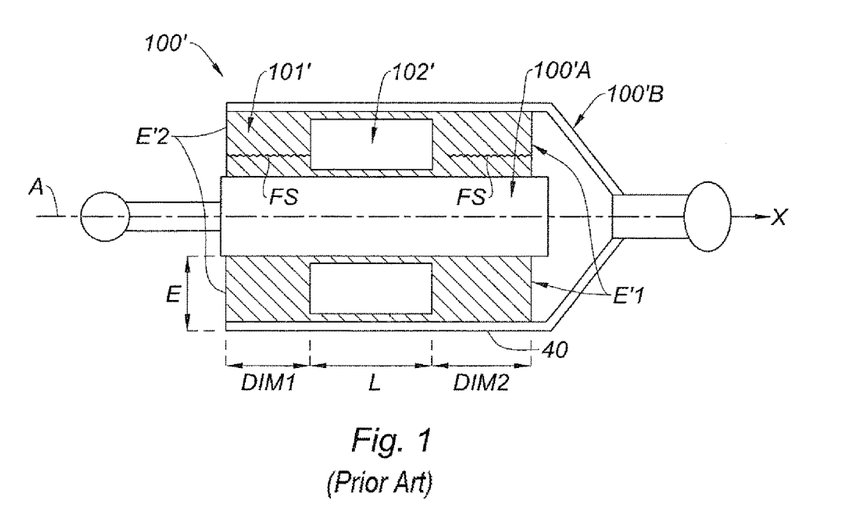
FIGS. 1 and 2 show a prior art damper described in FR 2,949,432.
Figure 2:
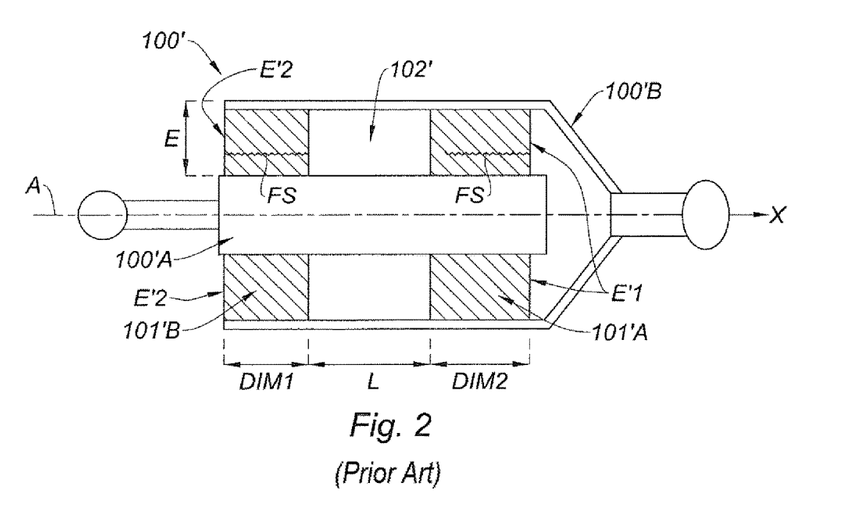

Two embodiments of the damper are shown by FIG. 1 and FIG. 2, respectively.

This damper 100' comprises two frame elements 100'A, 100'B each intended to be mounted on one of the parts of a rotary wing aircraft.

In FIG. 1, the damper 100' comprises an elastomer layer 101' positioned between the two frame elements 100'A, 100'B and a single chamber 102' positioned within the elastomer layer 101'. The single chamber 102' is filled with colored liquid. The single chamber 102' is positioned at a predetermined distance DIM1, DIM2 from one and/or the other of the ends E'1, E'2 of the elastomer layer.

Under the effect of the repeated relative movement of the parts of the rotary wing aircraft rotor, one or more crack(s) spread from at least one of the ends E'1, E'2 of the elastomer layer 101' toward the single chamber 102'. This crack is characteristic of fatigue-related damage of the elastomer layer 101'.

When this crack reaches the single chamber 102', the colored liquid contained in the single chamber passes through the crack and tends to leave the damper 100'.

Thus, during a maintenance operation, a technician can become aware of the liquid leak outside the single chamber 102' and deduce therefrom that the part must be changed.

As a result, the solution proposed in document D1 prevents a maintenance technician from taking a depth and/or width measurement of the crack.

Furthermore, inasmuch as the single chamber 102' has an annular section going all the way around the elastomer layer around its longitudinal axis, one ensures that any crack spreading from at least one of the ends E'1 and E'2 of the elastomer layer 101' toward the single chamber 102' is able to reach this single chamber 102'.

However, the presence of this single chamber 102', which has an annular section going all the way around the elastomer layer around its longitudinal axis, alters the mechanical properties, in particular the dynamic properties, of the damper 100', relative to a traditional damper (i.e., without a chamber like that proposed in document D1, all other things being equal, in particular regarding its dimensions).

The presence of such a chamber 102' can also have a negative impact on the lifetime (fatigue) of the damper.

The alteration of the mechanical properties can be accentuated, relative to such a traditional damper, when the single chamber 102' furthermore splits the elastomer layer 102' into two separate parts 101'A, 101'B, as shown in FIG. 2.

This can also have a negative impact on the lifetime (fatigue) of the damper.

SUMMARY

One aim of the invention is to propose a device of the aforementioned type able to provide information relative to the level of fatigue-related damage of said device, making it possible to limit the alteration of the mechanical properties relative to a device like that proposed in document D1.

Another aim of the invention is also to propose such a device that further makes it possible to minimize the alteration of the mechanical properties relative to a traditional device.

To that end, the invention proposes a device intended to be inserted between two parts of a rotary wing aircraft that are likely to undergo a repeated relative movement, the device comprising:

at least two frame elements intended to be mounted on at least one of the two parts of the aircraft, and at least one layer of elastomer positioned between the two frame elements, said at least one layer being defined by a first surface $S_I$ belonging to the inner volume $V_{int}$ of the device, a second surface $S_E$ also belonging to the inner volume $V_{int}$ of the device, and an outer surface $S_{ext}$ not belonging to the inner volume $V_{int}$ of the device, characterized in that the device comprises, within the inner volume $V_{int}$ of the device, at least two independent pouches each positioned at a predetermined distance from the outer surface $S_{ext}$, each pouch being filled with a product P capable of flowing outside its pouch when a crack has spread from said outer surface $S_{ext}$ toward the pouch in question.

This device may also have at least one of the following features, considered alone or in combination:

the product P has a different color from the color of said at least one elastomer layer;

the product P has luminescence properties, for example obtained with an additive such as optical brightener, that the elastomer layer does not have;

the product P is chosen from among an elastomer able to be visually distinguished from the elastomer forming the elastomer layer, a liquid, a pressurized gas, a paste or a gel;

the product P being elastomer, it assumes the form of calibrated crumbs;

the product P being a pressurized liquid or gas, the device comprises a pressure sensor for this pressurized liquid or gas;

said at least two independent pouches are situated at a same predetermined distance from the outer surface $S_{ext}$;

said at least two independent pouches are situated at different predetermined distances from the outer surface $S_{ext}$;

the surface $S_{f,T}$ of all of the pouches, projected orthogonally on a reference surface $S_{ref}$ of said at least one elastomer layer, represents a maximum of 5% of this reference surface, the reference surface being a surface having a shape identical to one and/or the other of the first and second surfaces defining said at least one elastomer layer and that are in the inner volume $V_{int}$ in the device;

the surface $S_{f,T}$ of the set of pouches, projected orthogonally on a reference surface $S_{ref}$ of said at least one layer of elastomer, represents a maximum of 4% of that reference surface, and preferably a maximum of 3% of that reference surface;

the device comprises, between the two frames, a stack including said at least one elastomer layer and at least one shell made from a non-elastomer material that is more rigid than the elastomer forming said at least one elastomer layer;

at least one of said at least two independent pouches crosses through at least one elastomer layer and at least one shell;

at least one of said at least two independent pouches extends from one frame element to the other;

said at least two independent pouches are made in an elastomer layer, without crossing through a shell;

said at least two independent pouches are made in a same elastomer layer;

said at least two independent pouches are made in two different elastomer layers;

the device is chosen from among: a laminated thrust bearing, a damper, a laminated pad, a laminated ball joint, a laminated hinge.

BRIEF DESCRIPTION OF THE DRAWINGS

The invention will be better understood and other aims, advantages and features thereof will appear more clearly upon reading the following description, done in reference to the appended drawings, in which:

FIG. 6, which comprises FIGS. 6(a) to 6(d), provides some geometric data of an experimentally tested damper;

FIG. 9, which includes

FIG. 10, which includes FIGS. 10(a) to 10(c), shows a laminated thrust bearing according to the invention in a perspective view, a side view and a sectional view, respectively;

FIG. 11, which includes

FIG. 12, which includes

FIG. 13, which comprises

DETAILED DESCRIPTION

Figure 3:
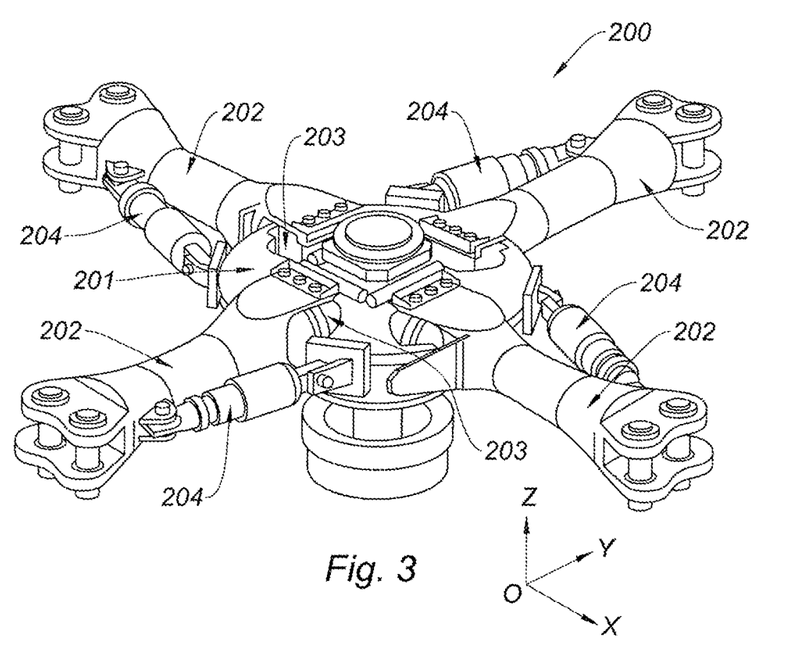
FIG. 3 shows a general view of a primary helicopter rotor.

FIG. 3 shows a primary rotor 200 of a rotary wing aircraft, on which one can see a hub 201 and boots 202 extending radially from the hub 201 and designed to bear the blades (not shown) of this aircraft.

The presence will be noted of laminated thrust bearing 203, spherical in the case at hand, positioned between the hub 201 and the end of each of the boots 202 situated on the side of the hub 201.

The presence of dampers 204 will also be noted, positioned between the hub 201 and the opposite end of each of the boots 202. They are generally called hub-blade dampers. The dampers 204 are generally not laminated.

The spherical laminated thrust bearings 203 and the dampers 204 are typically devices that can be subject to the invention.

It should also be noted that, although FIG. 3 shows a primary rotor, the invention may also apply to laminated thrust bearings or dampers, for example not laminated, that may be implemented on the rear rotor (not illustrated) of such an aircraft.

Other devices usable for such aircraft, for example planar laminated thrust bearings, cylindrical hinges or conical hinges, laminated ball joints or blade-blade dampers (not shown in the appended figures), can also be subject to the invention. These devices are not necessarily installed at a rotor of a rotary wing aircraft.

Figure 4A:
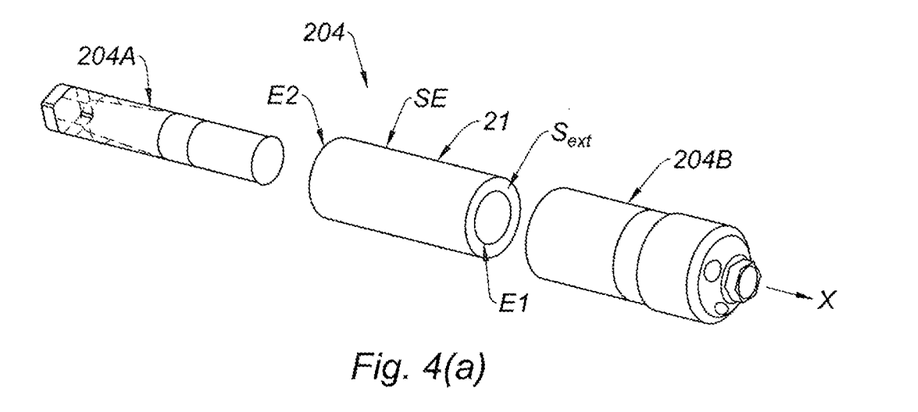
FIG. 4(a) is an exploded view of a damper according to the invention, in new condition.

FIG. 4(a) shows a damper 204 according to the invention in an exploded perspective view.

The damper 204 comprises a first frame element 204A (central frame), for example made from a metal material, a second frame element 204B (outer frame), which can also be made from a metal material, and an elastomer layer 21 filling in the space between the two frame elements 204A, 204B. The central frame 204A generally assumes the form of a cylinder and the outer frame 204B assumes the form of a cylindrical ring. As a result, the elastomer layer 21 generally assumes the form of a cylindrical ring.

The elastomer layer 21 is defined by several surfaces $S_{ext}$, $S_I$, $S_E$.

The surface $S_{ext}$ is an outer surface that is split into two parts in the case at hand, and defined by its two ends E1, E2 that are not in contact with either of the frame elements 204A, 204B. The outer surface $S_{ext}$ is not part of the inner volume $V_{int}$ of the damper 204. It forms the outer contour of the elastomer layer 21.

The surface $S_I$ of the elastomer layer 21 forms a first surface belonging to the inner volume $V_{int}$ of the damper 204 and the surface $S_E$ forms a second surface also belonging to the inner volume $V_{int}$ of the damper 204. Given the shape of the elastomer layer 21, the surfaces $S_I$, $S_E$ have an identical shape, in the case at hand cylindrical. The surface $S_I$ is in contact with the inner frame 204A and the surface $S_E$ is in contact with the outer frame 204B.

Figures 4B, 4C, 5A, 5B:
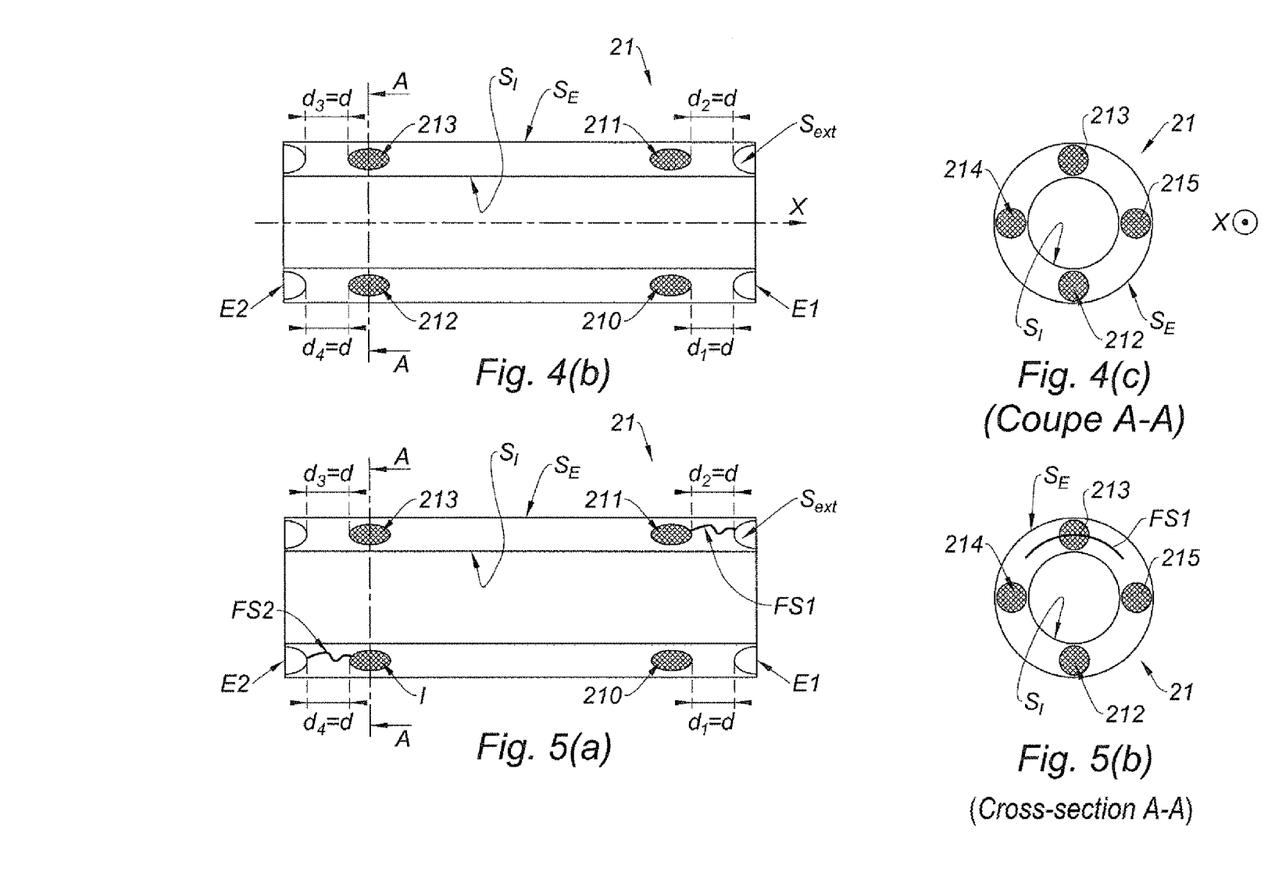
FIG. 4(b) is a longitudinal sectional view of the elastomer layer of FIG. 4(a)
FIG. 4(c) is a cross-section of the elastomer layer of FIG. 4(a) along cutting plane A-A shown in FIG. 4(b)
FIG. 5(a) is a view similar to that of FIG. 4(a), but when the damper must be changed.
FIG. 5(b) is a cross-section of the elastomer layer of FIG. 5(a)

The elastomer layer 21 also comprises a plurality of pouches 210, 211, 212, 213, 214, 215, 216 that are filled with a product, capable of flowing outside the pouch when a crack is present. In the case illustrated in FIGS. 4(a) to 4(c) and 5(a), 5(b), four pouches are provided for each end E1, E2 of the elastomer layer 21. These pouches are situated, in this example, at 90° relative to one another, as shown in FIGS. 4(c) and 5(b).

The product filling each pouch will advantageously have a component, for example an additive, to accentuate the contrast with respect to the elastomer of the elastomer layer 21. For example, this may involve a dye having a color, for example red, different from the color of the elastomer making up the elastomer layer 21, the latter generally being black.

Each pouch 210, 211, 212, 213, 214, 215, 216 is positioned, within an inner volume $V_{int}$ of the damper 204, and more specifically of the elastomer layer 21, at a predetermined distance $d_1$, $d_2$, $d_3$, $d_4$ from the outer surface $S_{ext}$ of the elastomer layer 21. This outer surface not being part of the volume of the damper, it will be understood that this distance $d_1$, $d_2$, $d_3$, $d_4$ is non-zero. This distance is defined along the longitudinal axis (axis X) of the elastomer layer. In the case at hand, we also have $d=d_1=d_2=d_3=d_4$.

During a relative repeated movement between the parts of the rotary wing aircraft on which the frame elements 204A, 204B are mounted (cf. FIG. 3), a crack spreads from the upper surface $S_{ext}$ of the elastomer layer 21 (end E1 and/or end E2), in the longitudinal direction of this layer 21, until reaching one of the pouches 210, 211, 212, 213, 214, 215, 216.

This situation is shown in FIGS. 5(a) and 5(b). FIG. 5(b) corresponds to FIG. 4(b), once cracks FS have reached certain pouches 211, 212 including the product capable of flowing outside the pouch when a crack is present. FIG. 5(b) corresponds to FIG. 4(c), once cracks FS have reached these same pouches 211, 212 including said product.

Once one of these pouches has been reached, the product that it contains passes through the crack and moves toward the outside of the elastomer layer 21. The product ultimately leaves the outer surface $S_{ext}$ and therefore becomes visible for maintenance technician.

It is fully possible to consider providing different distances $d_1$, $d_2$, $d_3$, $d_4$. In particular, it is possible to consider $d_1=d_2$ (on the side of the end E1) and $d_3=d_4$ (on the side of the end E2), with for example $d_1<d_3$. It is thus possible to position the pouches 210, 211 at a smaller distance from the end E1 of the outer surface $S_{ext}$ than the distance separating the pouches 212, 213 from the end E2 with the outer surface $S_{ext}$. The pouches 210, 211 then serve to notify a maintenance technician, indicating to the latter that the damper 204 has reached a certain level of fatigue-related damage for which the damper does not need to be changed, for example using a product, capable of flowing outside the pouch if a crack appears, of a first color to fill these pouches 210, 211. The other pouches 212, 213 then make it possible to define a change criterion of the damper 204, for example by using a product, capable of flowing outside the pouch in case of crack, the color of which is different from the color of the product provided in the pouches 210, 211.

The existence of these pouches, filled with said product, therefore makes it possible to obtain information relative to the fatigue state of the device. Furthermore, providing several pouches increases the likelihood of identifying the presence of a crack. The fact that these pouches are independent also limits the alteration of the mechanical properties of the damper, relative to the device proposed in document D1, all other things being equal, in particular regarding the dimensions of the device.

In order to further limit the alteration of the mechanical properties of the damper during use and to maintain a lifetime in accordance with or close to that of a traditional damper, the damper 204 according to the invention also provides pouches with limited dimensions.

More specifically, it should be noted that during operation, a traditional damper works by shearing due to the relative movement between the two frames 204A, 204B. The presence of pouches 210-216 creates a discontinuity in the transmission of shear chain between the surface $S_I$, the elastomer thickness and the surface $S_E$ of the elastomer layer 21.

Figure 13A:
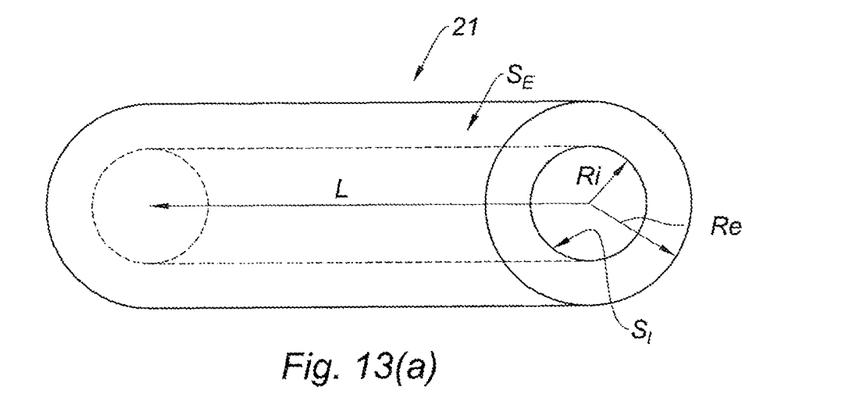
FIGS. 13(a) and 13(b), shows an elastomer layer of a damper according to FIG. 4(a), in longitudinal view and partial cross-sectional view, respectively.
Figure 13B:
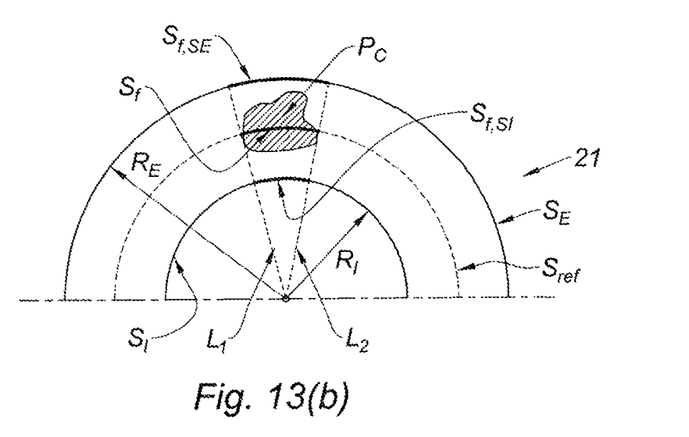

FIGS. 13(a) and 13(b) show diagrammatic views of the elastomer layer, in longitudinal view and partial cross-sectional view, respectively.

The mechanical properties of the traditional damper, i.e., without pouch or chamber, in new condition, can be shown by a so-called reference rigidity $K_{ref}$.

It is also possible to associate, with this traditional damper in new condition, a reference surface such that:

$$S_{ref}=(S_I+S_E)/2 \tag{R1}$$

where $S_I$ is defined by $S_I=2\pi R_I \cdot L$ and $S_E=2\pi R_E \cdot L$ with L the length of the elastomer layer 21, $R_I$ its inner radius and $R_E$ its outer radius.

The reference surface $S_{ref}$ is shown in dotted lines in FIG. 13(b), the latter ultimately being based on an average radius of the elastomer layer 21.

When a pouch $P_C$ with any shape, emerging or not, is provided (cf. FIG. 13) in the elastomer layer 21, all other things also being equal relative to the traditional damper (length, thickness, nature of the material forming the elastomer layer), it is possible to define the abatement obtained in terms of mechanical properties, as follows:

$$\Delta K(\%)=100\% \cdot (K_f-K_{ref})/K_{ref} \tag{R2}$$

where $K_f$ represents the rigidity, in new condition, of the elastomer layer 21 including this pouch $P_C$.

It will be noted that $\Delta K$ (%) is a negative percentage.

The quantity $\Delta K$ can also be expressed in the form:

$$\Delta K(\%)=100\% \cdot S_f/S_{ref} \tag{R3}$$

where $S_f$ represents the surface projected, orthogonally to the reference surface (radial projection here), of the pouch on the reference surface $S_{ref}$. In practice, to obtain the surface $S_f$, each point of the pouch, which is projected orthogonally over the reference surface, is taken into consideration.

The projected surface $S_f$ obtained is in the case at hand defined by:

$$S_f=(S_{f,SI}+S_{f,SE})/2 \tag{R4}$$

with $S_{f,SI}$ the surface of the pouch P projected on the surface $S_I$ of the elastomer layer 21 and $S_{f,SE}$ the surface of the pouch P projected on the surface $S_E$ of the elastomer layer 21.

Reference can be made to FIGS. 13(a) and 13(b).

It will be noted from relationship (R3) that if $S_f$ is zero (case of absence of pouch), then $\Delta K$ (%) is zero, which means that the stiffness is not modified.

In particular, it will be noted in these figures that there are two dotted lines L1, L2 that make it possible to define the surface of the pouch P, in terms of solid angle. It is the surface of the pouch that is taken as the basis for the orthogonal projection on the reference surface $S_{ref}$ and thus to obtain $S_f$.

In the context of the invention, N pouches with N≥2 are provided.

It then suffices to replace $S_f$ (case of a single pouch) in relationship (R3) with the total projected surface $S_{f,T}$ of all of the N pouches on the reference surface $S_{ref}$. Each projection is done orthogonally to the reference surface $S_{ref}$. The reference surface is obtained according to relationship (R4).

More specifically, we can have:

$$S_{f,T}=\Sigma S_{f,i} \text{ with } i \text{ varying from 1 to } N$$

where $S_{f,i}$ is determined, for each i comprised between 1 and N, according to relationship (R4).

Consequently, for N pouches with N≥2, relationship (R3) becomes:

$$\Delta K(\%)=100\% \cdot S_{f,T}/S_{ref} \tag{R5}$$

It should be noted that, in the case where certain pouches have surfaces projected on the reference surface that at least partially overlap, the shared part is only counted once in relationship (R5). The projected surface of one pouch from among the N pouches must therefore define a separate projected surface from the other projected surfaces. This is justified by the fact that, mechanically, the break in continuity in the transmission chain of the forces from one frame to the other (shearing; increasingly radially close transmission) must not be taken into account several times.

Figure 6A:
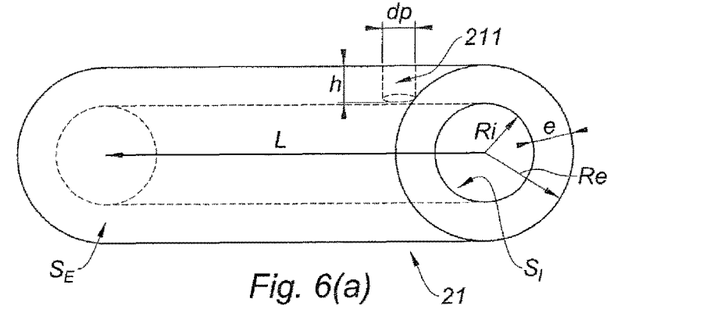
Figure 6B:
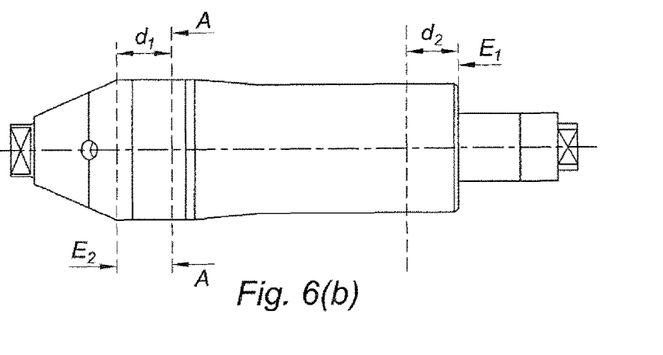
Figure 6C:
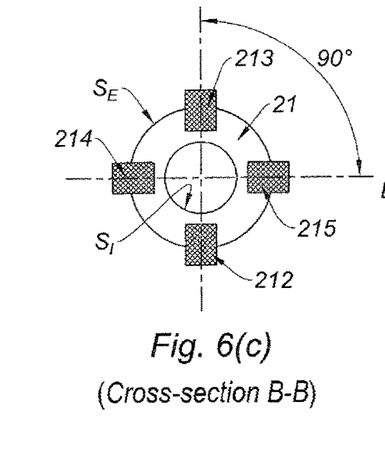

In practice, the pouches will in any case advantageously be installed in different locations on the circumference of the elastomer layer 21 to perform their function of detecting cracks optimally (for example, in FIG. 6(c), the pouches are at 90° from one another on the circumference, such that there cannot be any overlap in the orthogonally projected surface of the different pouches on the reference surface).

Lastly, in order to still further limit the alteration of the mechanical properties of the damper during use and maintain a lifetime in accordance with or close to that of a traditional damper, it should be provided that the surface $S_{f,T}$ of all of the pouches, projected orthogonally on the reference surface $S_{ref}$ of the elastomer layer 21, represents at least 5% of the reference surface $S_{ref}$, at most 4% of the reference surface $S_{ref}$, at most 3% the reference surface $S_{ref}$, or at most 2% of the reference surface $S_{ref}$ or further at most 1% of the reference surface $S_{ref}$.

In relationship (R5), this means that the quantity ΔK (%) is, in absolute value and respectively, at most 5%, at most 4%, at most 3% or at most 2%, or further at most 1%.

As one can see from relationship (R1), the reference surface taken into consideration is an average surface between the surface $S_I$ and the surface $S_E$ of the elastomer layer 21.

This reference surface could be defined differently.

For example, one could consider the radially inner surface $S_I$ of the elastomer layer 21 as reference surface $S_{ref}$ ($S_{ref}=S_I$; relationship (R1) modified). In this case, the projected surface $S_f$ of the pouch P on this reference surface would be $S_{f,SI}$ ($S_f=S_{f,SI}$; relationship (R4) modified accordingly). According to another example, one could consider the radially outer surface $S_E$ of the elastomer layer 21 as the reference surface $S_{ref}$($S_{ref}=S_E$; relationship (R1) modified). In this case, the projected surface $S_f$ of the pouch P on this reference surface would be $S_{f,SI}$($S_f=S_{f,SI}$; relationship (R4) modified accordingly). This would not change anything about the result obtained on the abatement of the mechanical properties defined by relationship (R3) for a pouch, or the generalization for several pouches of relationship (R5).

Irrespective of the definition chosen for the reference surface $S_{ref}$, the latter must nevertheless be a surface that participates in the transmission of forces between the two frames. This reference surface therefore has, in the case of the damper 204, a symmetrical shape (it will in particular be noted that the reference surface cannot be the outer surface $S_{ext}$ defined by the end of the elastomer layer 21).

Consequently, the reference surface may more generally be defined as a surface having a shape identical to one and/or the other of the first $S_I$ and second $S_E$ surfaces defining the elastomer layer 21 and that are in the inner volume $V_{int}$ of the device, in the case at hand a damper 204.

The manufacture of a damper according to the invention is particularly easy for one skilled in the art.

One can start from a traditional damper, from which the pouches are made by piercing through the outer frame and the elastomer layer 21. The pouches should next be filled with a product capable of flowing outside the pouch in case of crack and a stopper should be provided to close each pouch.

Alternatively, it is possible to make the pouches at the same time that one makes the elastomer layer 21. The elastomer layer 21 is inserted between the two frames 204A, 204B according to common practice. No new piercing is then done in the outer frame.

Example Embodiment and Associated Test

A damper according to the invention was tested.

FIG. 6 specifies several indicative dimensions for this damper.

The length L (axis X) of the elastomer layer 21 is L=180 mm.

The thickness e (radial) of the elastomer layer 21 is e≅16 mm (inner radius Ri=23 mm; outer radius Re=39 mm).

The elastomer layer 21 is made from natural rubber.

Four pouches were made, at each end E1, E2 of the elastomer layer 21, or a total of eight pouches, independent from one another.

The projected surface $S_{f,T}$ at each of the pouches, orthogonally on the reference surface, for example defined according to relationship (R1), is approximately 2%.

For a given end E1, E2, the four pouches in question were placed at 90° from one another. Furthermore, at the end E1, each pouch is situated distance of 3.5 cm from that end, defining the outer surface $S_{ext}$. Furthermore, at the end E2, each pouch is situated at a distance of 4.5 cm from the end E2, forming the outer surface $S_{ext}$.

Furthermore, each pouch has a cylindrical shape with a diameter $d_p$=10 mm and height h=14.5 mm.

To produce the damper, one starts from a traditional damper in which these pouches are made. To that end, a piercing through the outer frame and the elastomer layer 21 was done to produce each pouch, according to the dimensions previously provided.

Each pouch was filled with silicone gel including a dye (red color the case at hand), having a significant contrast relative to the color of the elastomer layer 21, which is black. The silicone gel can leave the pouch through a crack when one is present.

Then, each pouch was closed by a tight stopper.

Figure 6D:
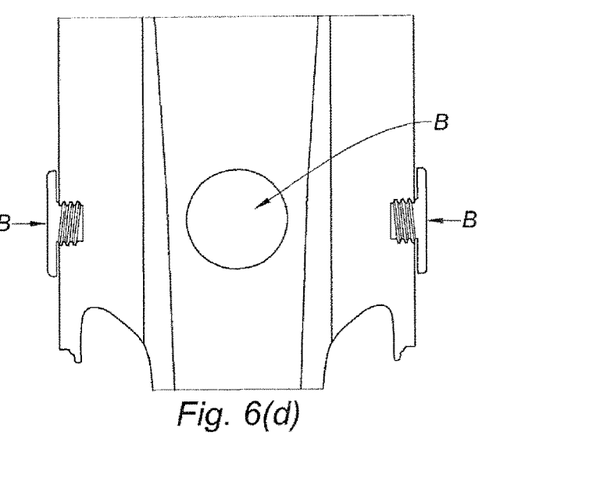

FIGS. 6(a) to 6(d) show the tested damper. In FIG. 6(a), the elastomer layer 21 is diagrammed, showing only a single pouch. In FIG. 6(b), the damper is diagrammed with its frames 204A, 204B to view the implantation site, relative to the end E1, E2 of the elastomer layer 21, of the pouches. In FIG. 6(c), a view is shown along cutting line A-A FIG. 6(b) with its different pouches. In FIG. 6(d), a view of the damper is shown from FIG. 6(b), once the stoppers B are mounted on the pouches.

Figure 7:
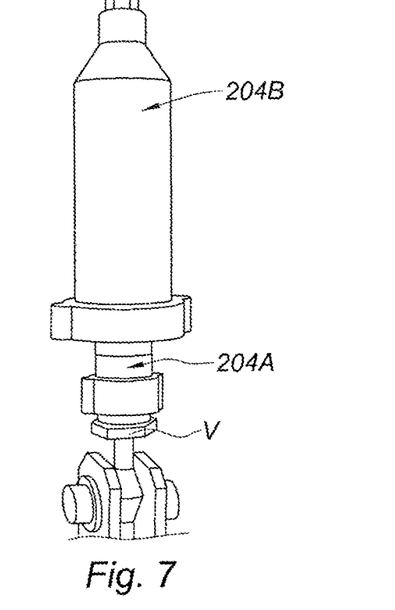
FIG. 7 shows several data specifying the conditions for carrying out the fatigue-related damage test done on the damper of FIG. 6.

FIG. 7 is a diagram showing the tested damper 204 with the means used for the fatigue test. In this FIG. 7, one sees the damper 204, one 204B (outer frame) of the frames and the elastomer layer. The frame 204B is immobile and to that end rests on a base S. A jack V is provided to move the other frame (inner frame; not referenced in FIG. 7 because not visible) at a given frequency. The movement of the inner frame 204A relative to the outer frame 204B makes it possible to work the elastomer layer 21 connecting the two frames 204A, 204B.

The more specific conditions of the fatigue test are provided in table 1.

TABLE 1

| conditions | frequency (Hz) | cycle | Dynamic movement over a cycle (mm) |
|---|---|---|---|
| 1 | 0.1 | 7 | 0 → +11 → 0 |

| conditions | frequency (Hz) | cycle | Static movement (mm) | Dynamic movement (mm) |
|---|---|---|---|---|
| 2 | 5 | 1000 | 3 | 3 |
| 3 | 5 | 80 | −5 | 10 |
| 4 | 5 | 10000 | −5 | 3 |

To carry out the test, conditions 1 to 4 follow on one another. Once condition 4 is completed, one returns to condition 1, and so forth.

Condition 1 corresponds to a preflight condition of a rotary wing aircraft on the primary rotor.

For condition 1, the movement frequency between the two frames 204A, 204B, implemented using the jack V, is 0.1 Hz, and 7 cycles are done. In condition 1, to carry out a cycle, one starts from the natural position of the damper (movement=0 mm), moves the central frame by 11 mm, the returns to the natural position.

Conditions 2 to 4 are representative of flight conditions.

The frequencies applied and the number of cycles are easily readable in table 1.

However, relative to condition 1, the movement should be read as follows. For example, for condition 2, a static movement of 3 mm is done between two frames, still relative to the natural position (movement=0 mm), then a dynamic movement of 3 mm is done around the position defined by the static movement. This amounts, during a cycle, to obtaining two movement limits of 6 mm (=3 mm+3 mm) and 0 mm (=3 mm−3 mm). For conditions 3 and 4, which follow condition 2, the reading principle of table 1 is the same.

This fatigue test is representative of one of the loading and damage modes frequently encountered for this type of damper, but the stresses of which are greater than in a real situation (harsher conditions), in order to accelerate the fatigue-related damage phenomenon. For all that, this fatigue test is quite representative of the conditions that may be encountered for a damper separating a hub and a helicopter rotor blade.

The criterion taken into consideration in order for the damper to be considered as having to be changed is based on a loss of 10% of the axial rigidity of the damper, in reference to the rigidity of the damper before the beginning of the test (new condition).

Under the effect of the repeated relative movement between the two parts P1, P2 (each of them being intended to be mounted on a part making it possible, on a helicopter, to generate this repeated relative movement), a crack spreads from the outer surface $S_{ext}$ toward the inner volume of the damper, and more particularly of the elastomer layer. When a pouch is reached, the silicone gel leaves the inner volume and becomes visible to the outside, at the outer surface $S_{ext}$.

Figure 8:
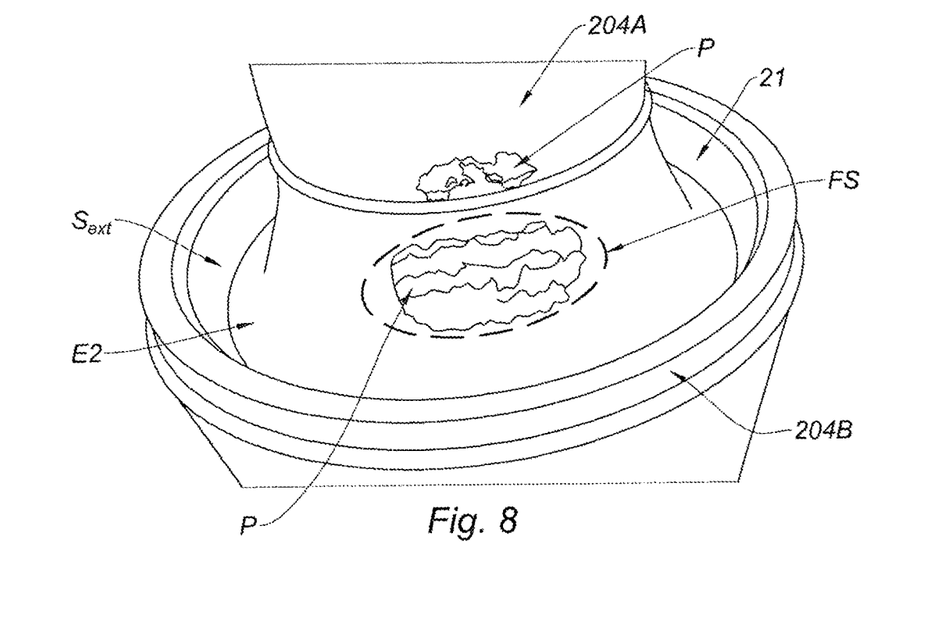
FIG. 8 is a view showing what can be seen from outside the damper, at the end of the fatigue-related damage test.

FIG. 8 shows what could be observed at the end of the test.

In this FIG. 8, one sees the frame elements 204A, 204B, the elastomer layer 21 at its outer surface $S_{ext}$, and more specifically on the side of the end E2. One also sees the crack FS having emerged at the outer surface $S_{ext}$ and the colored silicone gel P.

Such a situation indicates that the damper must be changed.

End of example.

The application to a damper 204, in the case at hand not laminated, is only one example.

Indeed, the invention can also apply to stratified structures, and more generally to different types of devices intended to be installed between two parts that may undergo a repeated relative movement within a rotary wing aircraft.

Figure 9A:
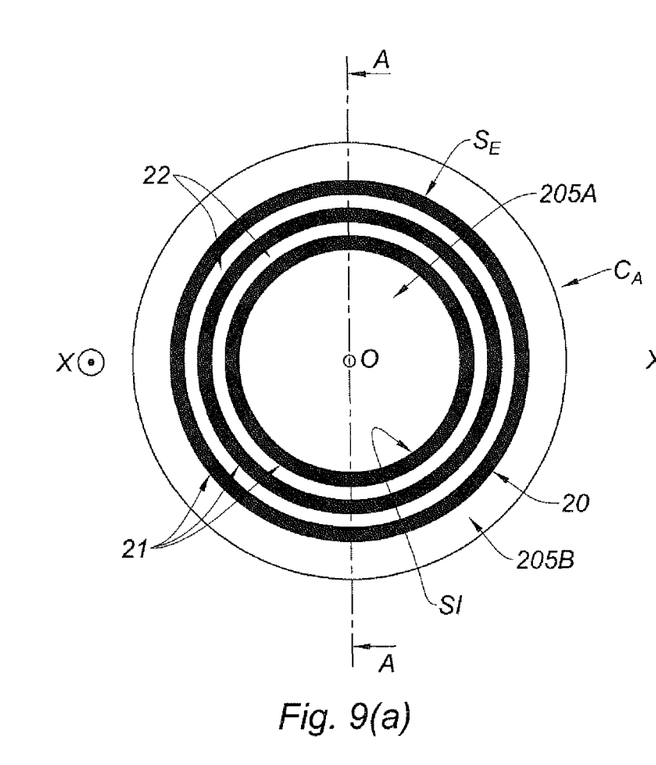
FIGS. 9(a) and 9(b), shows a cylindrical laminated hinge according to the invention from the side and in sectional view, respectively.
Figure 9B:
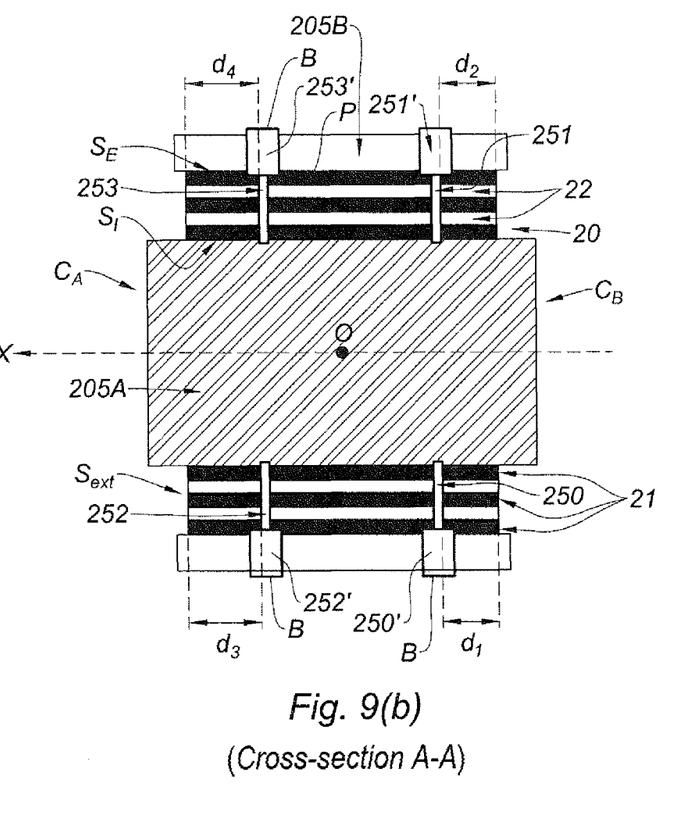

FIG. 9 for example shows a laminated hinge, cylindrical in shape, according to the invention. FIG. 9(a) is a side view of the laminated hinge, and FIG. 9(b) is a sectional view of this hinge.

This hinge 205 comprises a first frame element 205A, generally assuming the form of a cylinder, and a second frame element 205B, generally assuming the form of a ring. The laminate is a stack 20 made up of elastomer layers 21 alternating with shells 22 made from a material more rigid than the elastomer, each shell 22 for example being made from metal, with a metal alloy or a composite material. This laminate is placed between the two frames 207A, 207B, each layer 21 or shell 22 having a cylindrical shape.

The hinge 205 also comprises several independent pouches 250, 251, 252, 253, all situated at a predetermined distance $d_1$, $d_2$, $d_3$, $d_4$ from the outer surface $S_{ext}$ of the laminate 20. Here, the outer surface is split into two parts, each of these parts being defined by a side CA or CB of the hinge.

In the case at hand, four independent pouches are provided, two 250, 251 that are situated at a distance $d_1$, $d_2$ from the outer surface $S_{ext}$, on the side CB, and two others 252, 253 that are situated at a distance $d_3$, $d_4$ from the outer surface $S_{ext}$, on the side CA (these distances are taken along the longitudinal axis OX). Furthermore, the pouches can be diametrically opposite, in pairs, as shown in FIG. 9(b).

Advantageously, one will have $d=d_1=d_2=d_3=d_4$, as is the case in FIG. 9(b). The distance d is then appropriate so that when, during use, a crack reaches the depth d, this corresponds to a change criterion of the laminated hinge 205.

Each pouch 250, 251, 252, 253 may contain a product capable of flowing outside the pouch when a crack is present, this product advantageously being colored, as previously explained previously for the damper 204.

Each pouch 250, 251, 252, 253 can emerge on an orifice 250', 251', 252', 253' formed in the outer frame 205B. Each orifice includes a removable stopper B that makes it possible to have access to each pouch 250, 251, 252, 253 to fill it with said product. When the stopper B is closed, the hinge 205 can be used normally.

Furthermore, each pouch 250, 251, 252, 253 advantageously extends from one frame 205A to the other 205B, i.e., radially here, and as shown in FIG. 9(b). However, it is possible for at least one of these pouches 250, 251, 252, 253 not to extend from one frame to the other, but to extend from the outer frame 205B toward the central frame 205A, without reaching this central frame 205A.

It should be noted that the structure shown in FIGS. 9(a) and 9(b) could also be that of a damper 204 according to the invention, having a laminate between the two frame elements.

The reference surface can be defined in different ways. One possibility is to take into account the relationship (R1) with $S_I$ being the surface of the elastomer layer that is in contact with central frame 205A and $S_E$ being the surface of the elastomer that is in contact with the outer frame 205B. Another possibility to define the reference surface is to take into account relationship (R1) with $S_I$ being the surface of the elastomer layer 21 that is in contact with a shell 22 adjacent to said considered layer 21 and $S_E$ the surface of the elastomer layer 21 that is in contact with the other shell 22 adjacent to said considered layer 21.

The cylinder shape is not essential, and the laminated hinge 205 could also have a conical shape, the conical nature being done along the axis OX.

Figure 10:
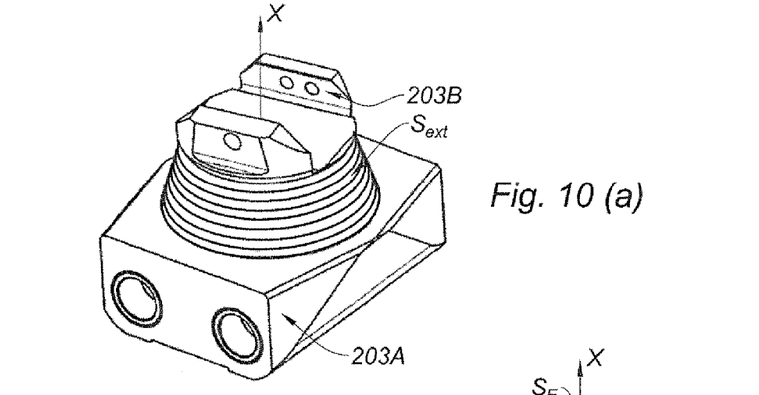

FIG. 10 shows a laminated thrust bearing, in the case at hand spherical, according to the invention. This is a laminated thrust bearing 203 typically used in the main rotor 200 of the helicopter that is shown in FIG. 1. FIG. 10(a) is a general perspective view of the laminated thrust bearing 203. FIG. 10(b) is a side view of the laminated thrust bearing of FIG. 10(a), and FIG. 10(c) is a sectional view of the laminated thrust bearing shown in FIG. 10(b).

This laminated thrust bearing 203 comprises two frame elements 203A, 203B each designed to be mounted on one of the parts 201, 202 of the rotor 200, as shown in FIG. 1.

The laminated thrust bearing 203 also comprises a stack 20 positioned between the two frame elements 203A, 203B, this stack being formed by a plurality of elastomer layers 21 separated from one another by a plurality of shells 22 made from a non-elastomeric material more rigid than the elastomer forming said elastomer layers. Each shell 22 of the plurality of shells 22 can be made from metal, with a metal alloy, or a composite material.

The laminated thrust bearing 203 also comprises several independent pouches 230, 231 all situated at a predetermined distance $d_1$, $d_2$ from the outer surface $S_{ext}$ of the laminate 20.

In the case at hand, two independent pouches 230, 231 are provided. Furthermore, the pouches will advantageously be diametrically opposite, as is shown in FIG. 10(c).

Advantageously, one will have $d=d_1=d_2$, as is the case in FIG. 10(c). The distance d is that adopted so that when, during use, a crack reaches the depth d, this corresponds to a change criterion of the laminated thrust bearing 203. It will be noted that, in light of the spherical shape of the laminated thrust bearing 203, the distances d, $d_1$, $d_2$ are curved distances, which follow the configuration of an elastomer layer 21.

Each pouch 230, 231 may contain a product, capable of flowing outside the pouch in case of crack, advantageously colored as previously explained for the damper 204.

Each pouch 230, 231 advantageously emerges on an orifice 230', 231' formed in the outer frame 203B. Each orifice 230', 231' includes a removable stopper B that makes it possible to have access to each pouch 230, 231 to fill it with said product. When the stopper B is closed, the laminated thrust bearing 203 can be used normally.

Furthermore, each pouch 230, 231 advantageously extends from one frame 203A to the other 203B, i.e., here substantially perpendicular to the lines formed by the layers 21 and the shells 22. However, it is possible that at least one of these pouches 230, 231 may not extend from one frame to the other, but extend from one 203B of the frames, i.e., on the side where the pouch 230, 231 emerges on an orifice 230', 231', toward the other frame 203A, without reaching this other frame 203A.

It may, however, be possible to provide that the distances $d_1$ and $d_2$ are different, so that, as previously explained, it is possible to obtain a warning criterion for a maintenance technician, indicating to that technician that the laminated thrust bearing 203 does not need to be changed, but has undergone a certain level of fatigue-related damage, and a change criterion for the laminated thrust bearing 203.

The reference surface can be defined in different ways. One possibility is to take into account relationship ($R_1$) with $S_I$ being the surface of the elastomer layer that is in contact with the frame 203A and $S_E$ being the surface of the elastomer that is in contact with the outer frame 203B. Another possibility, previously described, can be considered by defining the reference surface, according to relationship ($R_1$), relative to the shells adjacent to the considered elastomer layer 21.

Figures 11A, 11B, 11C:
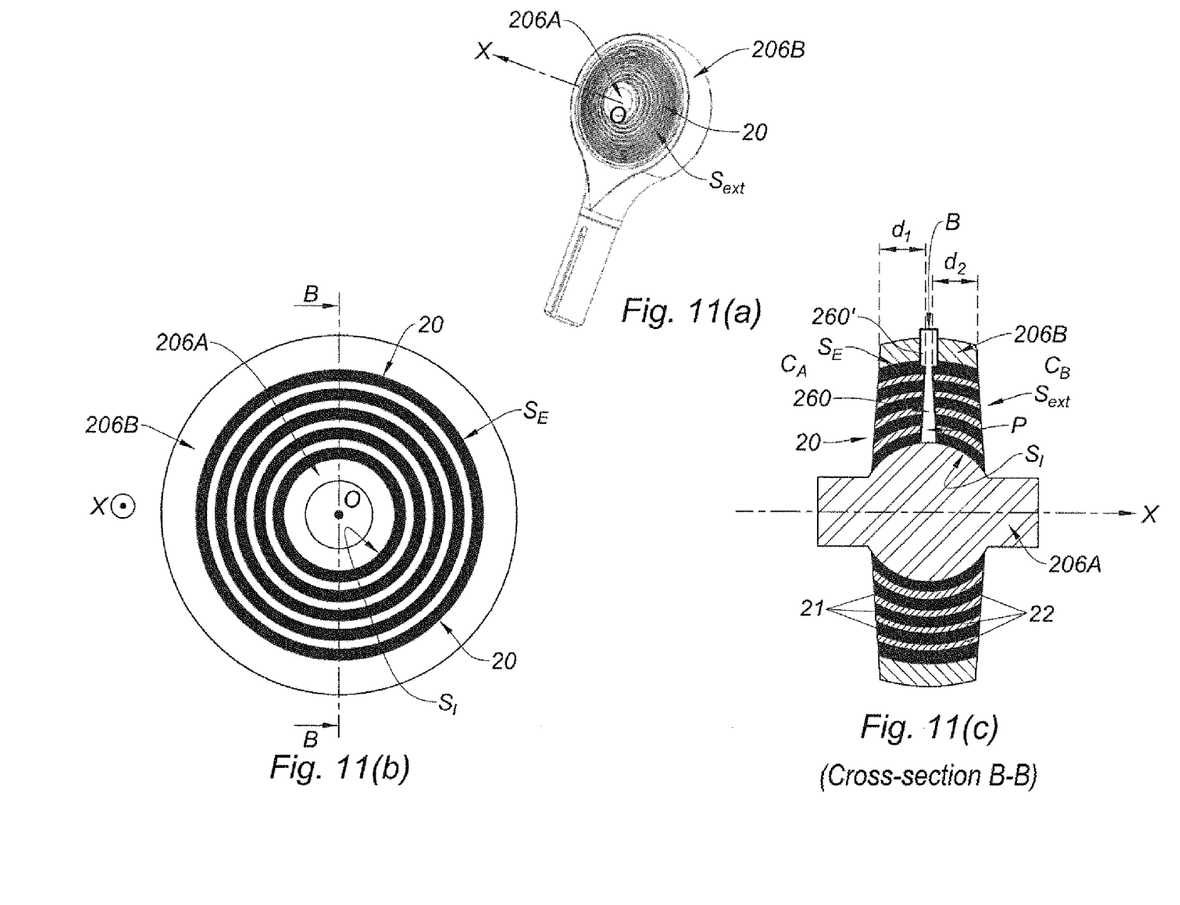
FIGS. 11(a) to 11(c), shows a laminated ball joint according to the invention in perspective view and in sectional view, respectively.

In FIG. 11, we have shown a laminated ball joint 206 according to the invention. More specifically, FIG. 11(a) is a general perspective view of the laminated ball joint, FIG. 11(b) is a partial front view and FIG. 11(c) is a sectional view of the depiction of FIG. 11(b).

This laminated ball joint 206 has a first frame element 206A and a second frame element 206B between which a laminate of the spherical type is positioned. In the case at hand, the laminate or stack 20 is made up of elastomer layers 21 alternating with shells 22 made from a material more rigid than the elastomer.

The laminated ball joint 206 also comprises several independent pouches 260 (only one is shown in FIG. 11(c) above the axis X, but it must be seen that at least one other pouch will be provided below the axis X), each situated at a predetermined distance $d_1$, $d_2$ from the outer surface $S_{ext}$ of the laminate 20 ($d_1$ is taken on side CA and $d_2$ on side CB of the outer surface $S_{ext}$).

Advantageously, one will have $d=d_1=d_2$, as is the case in FIG. 11(c). The distance d is that adopted so that when, during use, a crack reaches the depth d, this corresponds to a change criterion of the laminated ball joint 206. It will be noted that, in light of the shape of the laminated ball joint 206, the distances d, $d_1$, $d_2$ are curved distances, which follow the shape of an elastomer layer 201.

Furthermore, the illustrated pouch 260 has a flared shape becoming wider from the outer frame 206B toward the central frame 206A, to ensure that, irrespective of the considered elastomer layer 201, there is indeed a same distance d between the pouch 260 and the considered side CA, CB of the outer surface $S_{ext}$.

It could be done differently by providing, on the part situated above the axis X, not a flared pouch 260, but two non-flared pouches that are each at a distance $d_1$, $d_2$ from the respective side CA, CB of the outer surface $S_{ext}$, advantageously with $d=d_1=d_2$. Two other pouches, identical to the two non-flared pouches described above, can be provided below the axis X, or alternatively, a single flared pouch as previously described.

Each pouch 260 may contain a product capable of flowing outside the pouch in case of crack, this product advantageously being colored as previously explained for the damper 204.

Each pouch 260 advantageously emerges on an orifice 260' formed in the outer frame 206B. Each orifice 260' includes a removable stopper B that makes it possible to have access to each pouch 260 to fill it with said product. When the stopper B is closed, the laminated ball joint 206 can be used normally.

Furthermore, each pouch 260 advantageously extends from one frame 206B to the other 206A, i.e., here radially. However, it is possible that at least one of these pouches 260 may not extend from one frame to the other, but extend from the outer frame 206B, i.e., from the side where the pouch 260 emerges on an orifice 260', toward the central frame 206A, without reaching said central frame 206A.

It is possible to provide that the distances $d_1$ and $d_2$ be different, so that, as previously explained, it is possible to obtain a warning criterion for a maintenance technician, informing the latter that the laminated ball joint 206 does not yet need to be changed, but has undergone a certain level of fatigue-related damage, and a change criterion for the laminated ball joint 206.

The reference surface can be defined in different ways. One possibility is to take into account relationship (R1), with $S_I$ being the surface of elastomer layer that is in contact with the inner frame 206A and $S_E$ the surface of the elastomer that is in contact with the outer frame 206B. Another possibility, previously described, is possible by defining the reference surface using relationship (R1) relative to the shells adjacent to the considered elastomer layer 21.

Figure 12A:
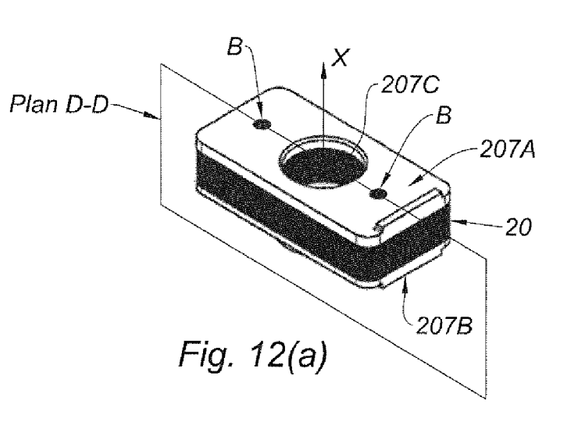
FIGS. 12(a) to 12(c), shows a rectangular laminated pad according to the invention in perspective view, side view and sectional view, respectively.
Figure 12B:
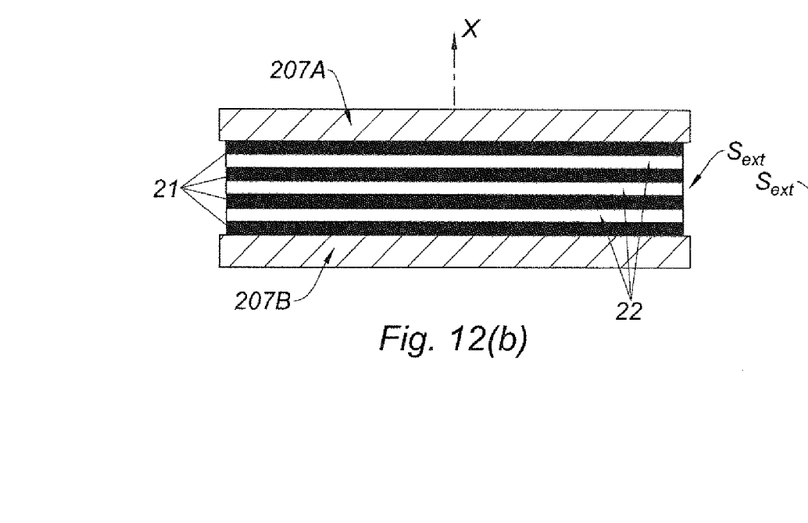
Figure 12C:
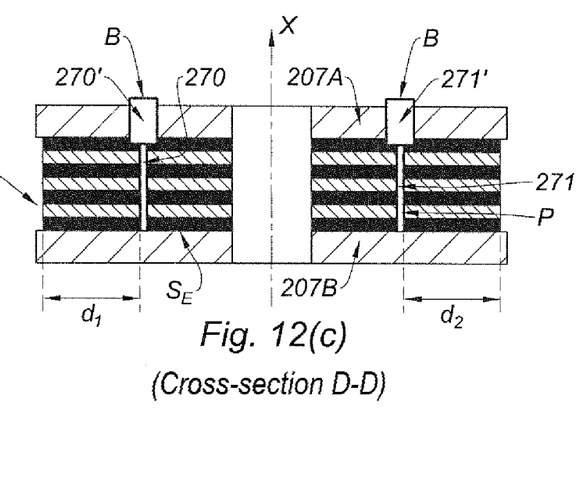

FIG. 12, which includes FIGS. 12(a) to 12(c), shows a laminated pad according to the invention in different views. FIG. 12(a) is a general perspective view of this pad. FIG. 12(b) is a side view and FIG. 12(c) is a sectional view, along cutting plane D-D of FIG. 12(a).

The laminated pad 207 comprises a first frame element 207A and a second frame element 207B as well as a laminate or stack 20 positioned between the two frame elements 205A, 205B. The laminate is made up of elastomer layers 21 alternating with shells 22 made from a material more rigid than the elastomer. A central orifice 207C is generally provided to perform the connection with the parts of the aircraft that are called upon to undergo a repeated relative movement (not shown).

The layers 21 and shells 22 are planar.

The laminated pad 207 also comprises several independent pouches 270, 271, each situated at a predetermined distance $d_1$, $d_2$ from the outer surface $S_{ext}$ of the laminate 20.

In the case at hand, two independent pouches 270, 271 are provided. Furthermore, the pouches will advantageously be diametrically opposite, as shown in FIG. 12(c).

Advantageously, one will have $d=d_1=d_2$, as is the case in FIG. 12(c). The distance d is then suitable so that when, during use, a crack reaches the depth d, this corresponds to a change criterion for the laminated pad 207. It will be noted that, in light of the rectangular shape of the laminated pad 207, the distances d, $d_1$, $d_2$ are distances considered perpendicular to the outer surface $S_{ext}$, following the plane formed by an elastomer layer 21.

Each pouch 270, 271 may contain a product capable flowing outside the pouch in case of crack, this product advantageously being colored as previously explained for the damper 204.

Each pouch 270, 271 advantageously emerges on an orifice 270', 271' formed in one of the frames 207A, 207B. Each orifice 270', 271' is provided with a removable stopper B that makes it possible to have access to each pouch 270, 271 to fill it with said product. When the stopper B is closed, the laminated pad 207 can be used normally.

Furthermore, each pouch 270, 271 advantageously extends from one frame 207B to the other 207A, i.e., here along the longitudinal axis OX. However, it is possible that at least one of these pouches 270, 271 may not extend from one frame to the other, but extend from the frame 207A, i.e., on the side where the pouch 270, 271 emerges on an orifice 270', 271', toward the other frame 207B, without reaching this other frame 207B.

Here again, it is possible to provide that the distances d1 and d2 be different, in order to obtain a warning criterion for a maintenance technician, indicating to the latter that the laminated pad 207 does not yet need to be changed, but has undergone a certain level of fatigue-related damage, and a change criterion of the laminated pad 207.

In the appended figures, the general shape of the laminated pad 207 is rectangular.

It is, however, possible to consider providing another shape, for example circular. The laminate then remains made up of elastomer layers 21 alternating with shells 22 made from a material more rigid than the elastomer that are planar, but with a circular shape.

In both cases of the rectangular or circular shape, the reference surface can be defined in different ways. One possibility is to take into account relationship (R1) with $S_I$ being the surface of the elastomer layer that is in contact with frame 203 and $S_E$ being the surface of the elastomer that is in contact with the outer frame 203B. In light of the planar shape of the laminate, other reference surfaces that can also be chosen, for example $S_I$ or $S_E$, will yield an identical value of the reference surface.

For all of the embodiments previously described, different products can be used to fill the pouches. The important points are on the one hand that this product be able to flow outside the pouch to go through a crack and exit to the outside, and on the other hand that it be distinguishable from the elastomer making up an elastomer layer 21.

Thus, it is possible to provide that the product filling at least one or each pouch is chosen from among:

a liquid;

a pressurized gas ("pressurized" should be understood as meaning a gas at a pressure higher than the atmospheric pressure under normal temperature and pressure conditions; CNTP);

a paste, for example modeling paste;

a gel, for example a silicone gel;

elastomer crumbs, for example not vulcanized, visually distinguishable from the elastomer making up an elastomer layer 21.

Irrespective of the considered product, it may have a color different from the elastomer of the elastomer layer 21. This can be done by providing an appropriate additive within the product. As an example, it is possible to consider an additive (pigment) of the isoindoline type (imparting a yellow color) or of the copper phthalocyanine beta type (imparting a blue color).

Alternatively or additionally, the product may have luminescent properties that an elastomer layer 21 does not have. For example, if the considered product is colorless in the visible domain, luminescent properties may be obtained by adding an additive. This additive may be an optical brightener, which, by nature, may give the translucent elastomer layer fluorescent or phosphorescent properties. One example of an optical brightener that may be appropriate is benzoxazole, for example offered under the name COMAX® OA by the company COMA Additive GmbH, in particular when the considered product is a liquid, paste, gel or elastomer. This optical brightener reacts with ultraviolet light.

In the particular case where a pouch is filled with elastomer crumbs (product), it should be possible to visually distinguish between these and the elastomer making up the elastomer layer 21.

The coloring or the luminescent properties for these elastomer crumbs can make it possible to make this distinction.

This is not the only possible choice.

In fact, it is possible to provide, alternatively or additionally, that the elastomer crumbs filling a pouch be calibrated, for example in the form of a sphere or rhomb. The calibrated elastomer crumbs can be distinguished visually, by their specific geometry, from the crumbs that may come from the formation of the crack in the elastomer layer 21, which have variable dimensions and shapes. In this case, it is completely possible to consider using, to fill a pouch, an elastomer with a chemical composition identical to that of the elastomer making up an elastomer layer 21.

Lastly, it should be noted that when elastomer crumbs are used to fill the pouch, the dimensions should be adapted to ensure that they can flow outside the pouch. This depends on the characteristics of the crack, which are related to the type of device in question in light of its application. These data are known by those skilled in the art.

Furthermore, when the pouch in question is filled with a liquid or pressurized gas, a pressure sensor measuring the pressure in the pouch can be considered. When a pressure sensor is provided, it is possible to consider installing, in an elastomer layer 21, a fluid communication between the pouch in question and the outer surface $S_{ext}$ of the considered device; the sensor strictly speaking, provided with pressure reading means, being installed on this outer surface.

For laminated devices, the various appended figures show pouches that cross through the elastomer layers 21 and the shells 22.

Alternatively, it is possible to provide that the pouches be situated only in the elastomer layers 21. For example, it is possible to consider at least one pouch per elastomer layer 21. It is also possible to consider that the pouches be situated in the same elastomer layer 21 or to provide several pouches per elastomer layer 21.

Irrespective of the considered embodiment, an elastomer layer 21 will advantageously be vulcanized. In some cases, however, a non-vulcanized elastomer layer 21 may be used.

The invention claimed is:

1. A device intended to be inserted between two parts of a rotary wing aircraft that are likely to undergo a repeated relative movement, the device comprising:
   at least two frame elements intended to be mounted on at least one of the two parts of the aircraft, and
   at least one layer of elastomer positioned between the two frame elements, said at least one layer being defined by a first surface belonging to an inner volume of the device, a second surface also belonging to the inner volume of the device, and an outer surface not belonging to the inner volume of the device,
   wherein the device comprises, within the inner volume of the device, at least two independent pouches each positioned at a predetermined distance from the outer surface, each pouch being filled with a product capable of flowing outside its pouch when a crack has spread from said outer surface toward said pouch.

2. The device according to claim 1, wherein the product has a different color from the color of said at least one elastomer layer.

3. The device according to claim 1, wherein the product has luminescence properties.

4. The device according to claim 3, wherein the product having luminescence properties comprises an optical brightener that the elastomer layer does not have.

5. The device according to claim 1, wherein the product is chosen among:

an elastomer able to be visually distinguished from the elastomer forming said at least one elastomer layer,
a liquid,
a pressurized gas,
a paste, or
a gel.

6. The device according to claim 5, wherein the product comprises crumbs of elastomer which have a specific geometry.

7. The device according to claim 5, wherein the product comprises a pressurized liquid or gas, and wherein the device comprises a pressure sensor for this pressurized liquid or gas.

8. The device according to claim 1, wherein said at least two independent pouches are situated at a same predetermined distance from the outer surface.

9. The device according to claim 1, wherein said at least two independent pouches are situated at different predetermined distances from the outer surface.

10. The device according to claim 1, wherein said at least two independent pouches define a surface, projected orthogonally on a reference surface of said at least one elastomer layer, that represents a maximum of 5% of said reference surface, the reference surface being a surface having a shape identical to one and/or the other of the first and second surfaces defining said at least one elastomer layer and that are in the inner volume of the device.

11. The device according to claim 10, wherein said surface of said at least two independent pouches which is projected orthogonally on said reference surface of said at least one elastomer layer, represents a maximum of 4% of that reference surface.

12. The device according to claim 1, wherein the device comprises, between the two frames, a stack including said at least one elastomer layer and at least one shell made from a non-elastomer material that is more rigid than the elastomer forming said at least one elastomer layer.

13. The device according to claim 12, wherein at least one of said at least two independent pouches crosses through at least one elastomer layer and at least one shell.

14. The device according to claim 1, wherein at least one of said at least two independent pouches extends from one frame element to the other.

15. The device according to claim 12, wherein said at least two independent pouches are made in an elastomer layer, without crossing through a shell.

16. The device according to claim 15, wherein said at least two independent pouches are made in a same elastomer layer.

17. The device according to claim 15, wherein said at least two independent pouches are made in two different elastomer layers.

18. The device according to claim 1, wherein the device is comprised of a laminated thrust bearing, a damper, a laminated pad, a laminated ball joint, or a laminated hinge.

* * * * *